(12) United States Patent
Billman et al.

(10) Patent No.: US 12,028,323 B1
(45) Date of Patent: Jul. 2, 2024

(54) LAYERED AUTHENTICATION AND PRIORITY ACCESS SYSTEMS AND METHODS

(71) Applicant: UIPCO, LLC, San Antonio, TX (US)

(72) Inventors: Bradly Jay Billman, Celina, TX (US); Jennifer Hunt Erickson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 453 days.

(21) Appl. No.: 17/362,459

(22) Filed: Jun. 29, 2021

Related U.S. Application Data

(60) Provisional application No. 63/046,284, filed on Jun. 30, 2020.

(51) Int. Cl.
*H04L 9/40* (2022.01)
*G06F 9/451* (2018.01)
*G06F 9/54* (2006.01)

(52) U.S. Cl.
CPC .............. *H04L 63/08* (2013.01); *G06F 9/451* (2018.02); *G06F 9/547* (2013.01); *H04L 63/0263* (2013.01)

(58) Field of Classification Search
CPC ..... H04L 63/08; H04L 63/0263; G06F 9/451; G06F 9/547
USPC .......................................................... 726/1
See application file for complete search history.

(56) References Cited

U.S. PATENT DOCUMENTS

2005/0262554 A1* 11/2005 Brooks ............... H04L 63/0263
  713/188
2006/0023738 A1* 2/2006 Sanda .................. H04L 43/045
  370/463

* cited by examiner

*Primary Examiner* — Benjamin A Kaplan
(74) *Attorney, Agent, or Firm* — Fletcher Yoder, P.C.

(57) ABSTRACT

The present disclosure relates generally to systems and methods for providing dynamic access levels based upon permitted provision of client system data. In particular, proactive blocking of access to protected systems/services may be implemented when client system electronic data provision requirements of the protected systems/services are not met.

20 Claims, 6 Drawing Sheets

LAYERED AUTHENTICATION AND PRIORITY ACCESS SYSTEMS AND METHODS

CROSS REFERENCE RELATED TO APPLICATIONS

This application claims priority from and the benefit of U.S. Provisional Application Ser. No. 63/046,284, entitled "LAYERED AUTHENTICATION AND PRIORITY ACCESS SYSTEMS AND METHODS," filed Jun. 30, 2020. This U.S. Provisional Application is hereby incorporated by reference in its entirety for all purposes.

BACKGROUND

The present disclosure relates generally to systems and methods for providing flexible authentication and access to protected systems. More specifically, the present disclosure relates to systems and methods that dynamically alter levels of access to protected systems based upon an amount of electronic data access provided by the client systems to the protected systems.

As electronic device networks become increasingly utilized, access to electronic devices may also become more complex. Today, users are oftentimes required to remember numerous passwords for a variety of electronic systems, as each electronic system may include its own set of password requirements. This can lead to an undesirable user experience, as passwords may be forgotten and/or memorialized in unsafe manners, susceptible to hacking by bad actors.

Accordingly, new systems and methods for electronic service and/or device access are provided herein. The techniques described herein enable dynamic access to electronic services and/or devices based upon dynamic provision of different types and amounts of electronic data.

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The current systems and methods provide dynamic access rights to protected systems based upon an amount and/or type of data provided via client systems. This may result in increased data sharing, while limiting information to only that which is requested by protected systems, resulting in increased data privacy despite increased data sharing.

Figure 1:
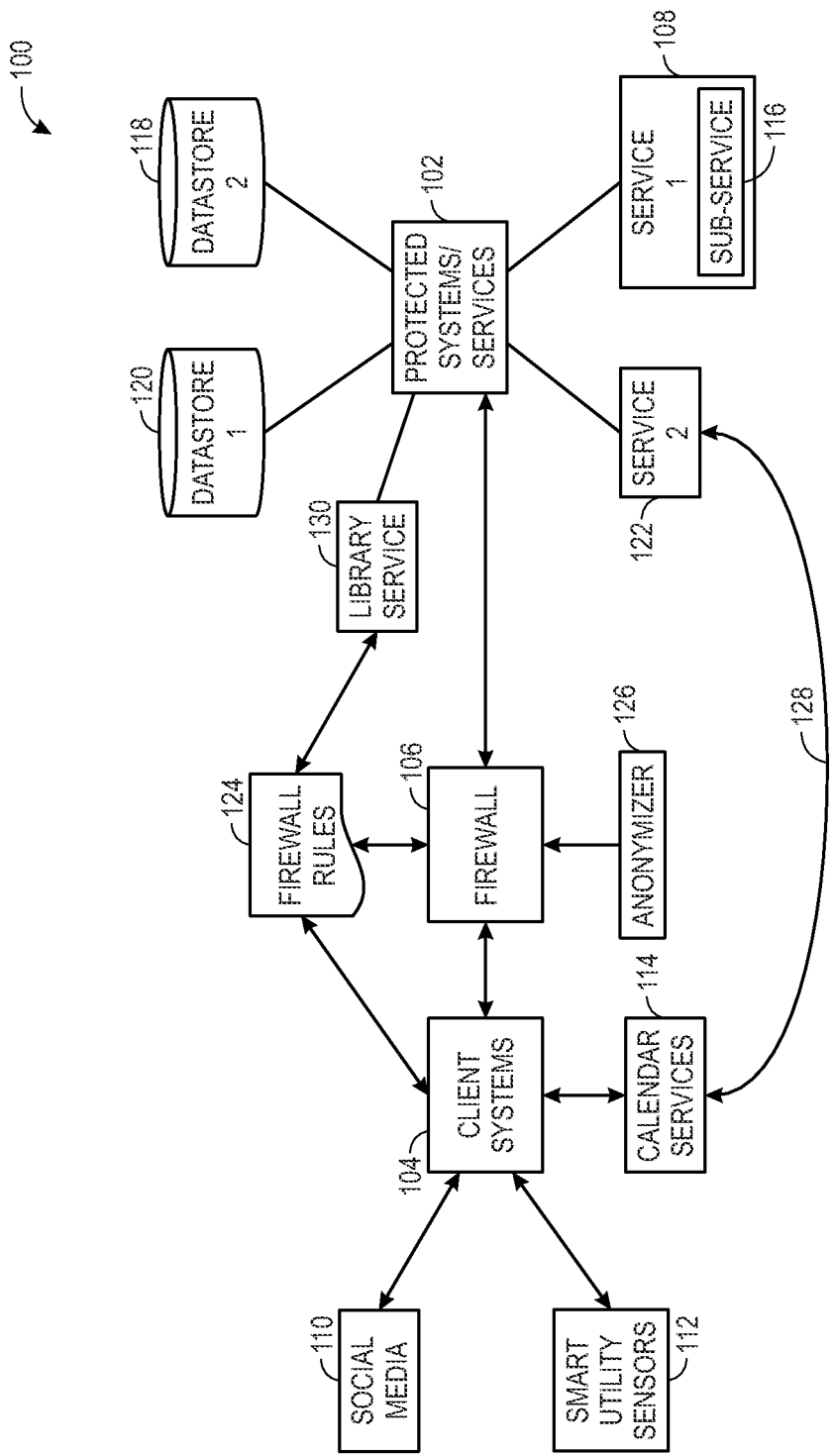
FIG. 1 is a schematic diagram, illustrating a system for dynamic access to one or more protected systems, based upon an amount and/or type of electronic data permitted to the systems, in accordance with certain embodiments.

FIG. 1 is a schematic diagram, illustrating a system 100 for dynamic access to one or more protected systems/services 102, based upon an amount and/or type of electronic data permitted to the protected systems/services 102 by the client systems 104, in accordance with certain embodiments. For example, the client systems 104 may provide electronic data through firewall 106 to the protected systems/services 102. This electronic data may provide access to certain ones of the protected systems/services 102. For example, access to Service 1 108 may be provided when basic identifying information is provided from the client systems 104. This could be provided via one or more services associated with the client systems 104. Example services may include social media services 110, smart utility sensor provision services 112, and/or electronic calendar services 114, to name a few. Basic access to Service 1 108 may be relatively less restrictive (e.g., enabling access when any one of the services associated with the client systems 104 provides identify information) as opposed to other sub-services, electronic devices, and/or services, such as Sub-Service 116, Datastore 1 118, Datastore 2 120, and/or Service 2 122, which may require electronic data from a particular service and/or a more particular type of electronic data.

In some embodiments, firewall rules 124 may provide an indication of particular type and/or source of electronic data that is required for access to each of the protected systems/services 102. In this manner, the firewall 106 may use the firewall rules 124 to block access attempts to certain systems when the required electronic data is not provided. In some embodiments, the electronic data is provided by the services themselves, independent of communication through the client systems 104. For example, communications line 128 illustrates calendar services 114 electronic data that is passed to Service 2 122 without passing through the client systems 104. Despite being sourced directly form the services, the electronic data may flow through the firewall 106 and the firewall 106 may retain an indication that the electronic data has been provided and/or is available.

Library services 130 may provide services that inform the client systems 104 of the available protected systems/services 102 and/or required electronic data provisions of the client systems 104 to access/use the protected systems/services 102. As will be discussed in more detail below, the library services 130 may provide data used to generate a graphical user interface (GUI) for the client systems 104, to facilitate electronic data provision and dynamic access to the protected systems/services 102.

In some embodiments, protected systems/services 102 may require certain electronic data but may not require particular portions of the electronic data (e.g., an identity association (e.g., of a client system 104 user)). In such a case, the anonymizer circuitry 126 may remove or modify the electronic data, removing and/or obfuscating these portions of the electronic data, prior to provision to the protected systems/services 102. In some embodiments, electronic data may be anonymized for certain protected systems/services 102, while not anonymized for others of the protected systems/services 102. In this manner, electronic data provided to the protected systems/services 102 may cater to the requirements of individual systems/services (e.g., as indicated in the firewall rules 124).

Figure 2:
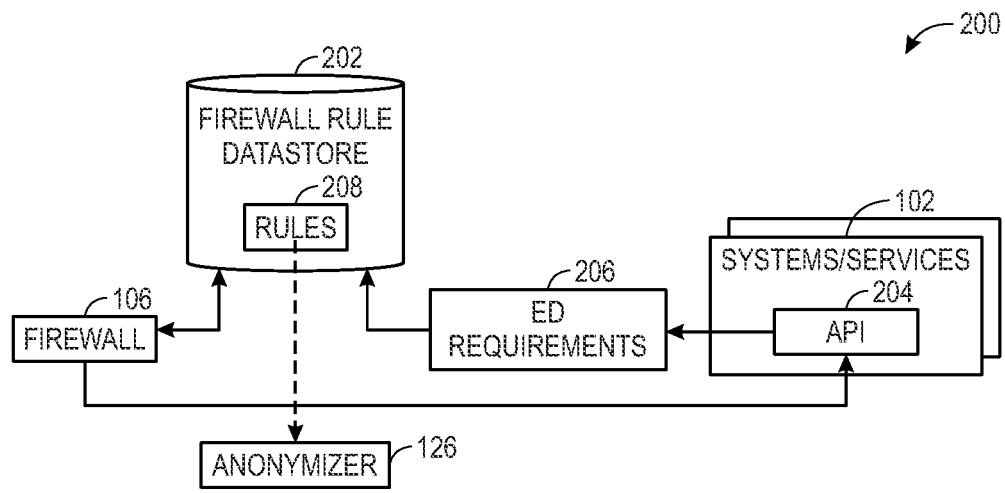
FIG. 2 is a schematic diagram, illustrating the interactions between the protected services, a firewall rule datastore, an anonymizer, and/or a firewall, in accordance with certain embodiments.

FIG. 2 is a schematic diagram, illustrating the interactions 200 between the protected systems/services 102, a firewall rule datastore 202, an anonymizer circuitry 126, and/or a firewall 106, in accordance with certain embodiments. As illustrated, an application programming interface (API) 204 of the protected systems/services 102 may provide electronic data requirements 206 (e.g., data packets) to the firewall rule datastore 202. These electronic data requirements 206 may be parsed and converted into firewall rules 208. For example, upon parsing the electronic data requirements 206, the data in the electronic data requirements 206 may be moved to firewall rule tables of or used by the firewall 106. In this manner, the firewall is able to identify particular electronic data requirements of the particular protected systems/services 102. Thus, the firewall 103 may pass electronic communications to the protected system/services 102 when client devices provide the required electronic data/data types and may otherwise refrain from passing electronic communications.

In some cases, the anonymizer circuitry 126 may be invoked based upon the rules 208. For instance, in some cases, the systems/services 102 may require that certain electronic data be provided by the client but may not require direct knowledge of the client that the electronic data pertains to. When the rules 208 indicate such a situation, the anonymizer circuitry 126 may sanitize the electronic data, such that the client identity is no longer associated with the electronic data. This may be done by stripping IP addresses, MAC addresses, account numbers, and/or user identifiers from the electronic data.

In some instances, the electronic data permitted for provision by the client may be independent of an electronic request provided by the client. In such a case, the firewall 106, firewall rule datastore 202, or other datastore may maintain an indication of data provision permitted by the client. When the electronic request is provided by the client, the firewall 106 may determine whether the client permitted the proper data provision based upon the indication. The firewall 106 may pass the electronic request when the proper electronic data has been permitted. Otherwise, the firewall 106 may refrain from passing the request.

Figure 3:
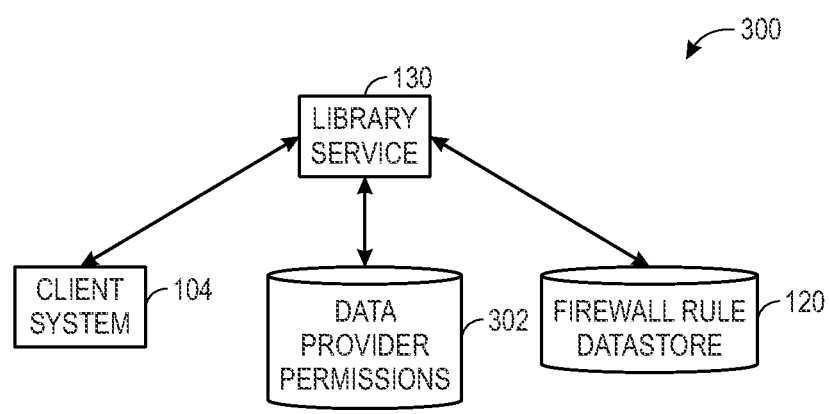
FIG. 3 is a schematic diagram, illustrating the interactions between a firewall rule datastore, a library service, and a client system, in accordance with certain embodiments.

FIG. 3 is a schematic diagram, illustrating the interactions 300 between a firewall rule datastore 120, a library service 130, a data provision permissions data store 302, and/or a client system 104, in accordance with certain embodiments. As mentioned above, the library services 130 may be used to generate, via the client systems 104, a graphical user interface indicative of protected systems/services 102 and/or the required electronic data sharing associated with protected systems/services 102. The library services 130 may provide GUI rendering commands to the client system 104, enabling the client system 104 to render the GUI. The GUI rendering commands may include an indication of one or more protected systems/services 102 and their corresponding electronic data provision requirements. As mentioned above, this information may be obtained via the firewall rule datastore 120 and/or the data provision permissions datastore 302. The GUI rendering instructions may also include an indication of whether the client systems currently meet the electronic data provision requirements and/or link generation instructions for generating a link to enable the client to easily permit the required electronic data provision. This information may be obtained by querying the data provision permissions datastore 302, which may provide an indication of particular permitted data provision provided by client system 104.

Figure 4:
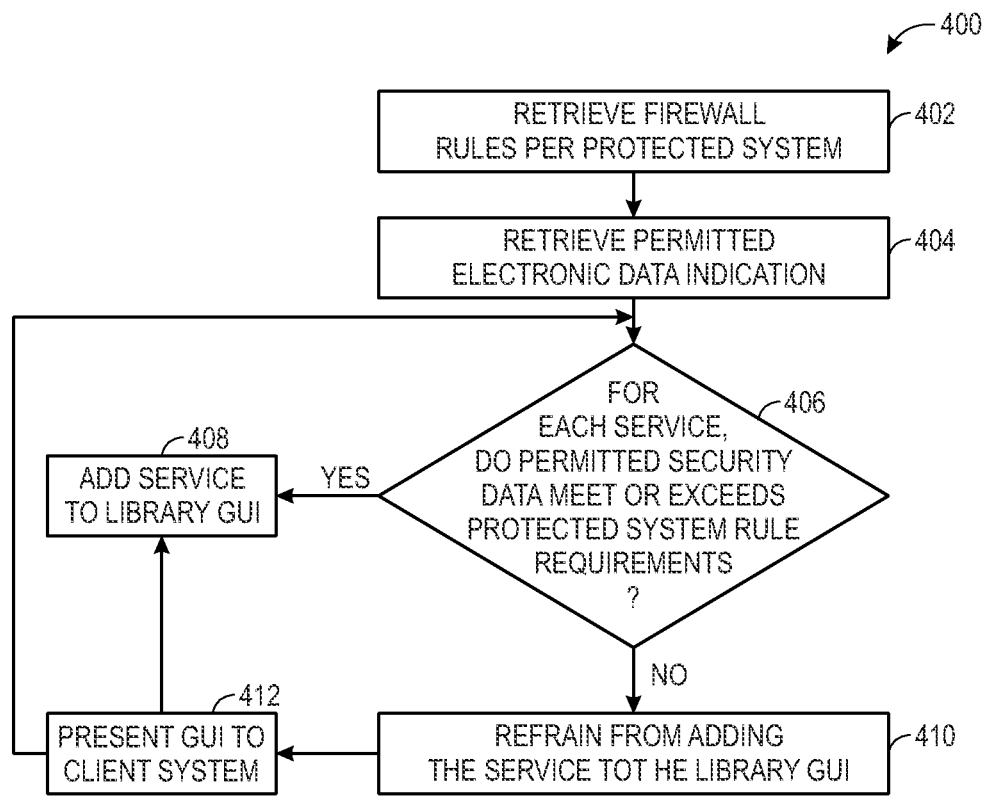
FIG. 4 is a flowchart, illustrating a process for presenting available services via library services, in accordance with certain embodiments.

In some embodiments, the library services 130 may provide a list of available systems/services that the client systems 104 currently have access to, based upon the electronic data provision permissions currently enabled by the client systems 104. FIG. 4 is a flowchart, illustrating a process 400 for presenting such available systems/services via library services, in accordance with certain embodiments. The firewall rules are retrieved for the protected systems/services 102 (block 402). For example, as mentioned above, firewall rules 208 may pertain to the protected systems/services 102 and may be stored in a firewall rule datastore 202, which may be independent from a firewall 106 and/or integrated to the firewall 106.

Additionally, an indication of the permitted electronic data provisions of the client requesting access to the protected system/services 102 is retrieved (block 404). For example, as discussed above, the data provision permissions datastore 302 of FIG. 3 may maintain such an indication. In some embodiments, client systems 104 may be polled to determine indications for the client systems 104.

Next, for each service, a determination may be made, identifying whether permitted data provision meets or exceeds requirements of the protected system/services 102 (decision block 406). For example, the permitted electronic data indications may be compared against the protected system/services 102 requirements to identify gaps in data provision that are required for particular ones of the protected systems/services 102. If the permitted data provision meets or exceeds the requirements of a given protected system/service 102, the given protected system/service 102 is added to the library service GUI (block 408). However, when the permitted data provision does not meet the requirements of the given protected system/service 102, the library services may refrain from adding the service to the library GUI (block 410). Alternatively, in some embodiments, the service could be added to the library GUI with an indication that certain data provision did not meet requirements of the service and/or an indication of the particular data provision that did not meet the requirements. In some embodiments, the library GUI may provide an electronic link to facilitate addition of permissions for providing this electronic data (e.g., by providing a link to a data provisions page of the client systems 104).

Blocks 406-410 may be completed for each of the protected systems/services 102. The library service GUI may be provided to the client system 104 (e.g., a client computer) (block 412) for presentation by the client system 104.

Figure 5:
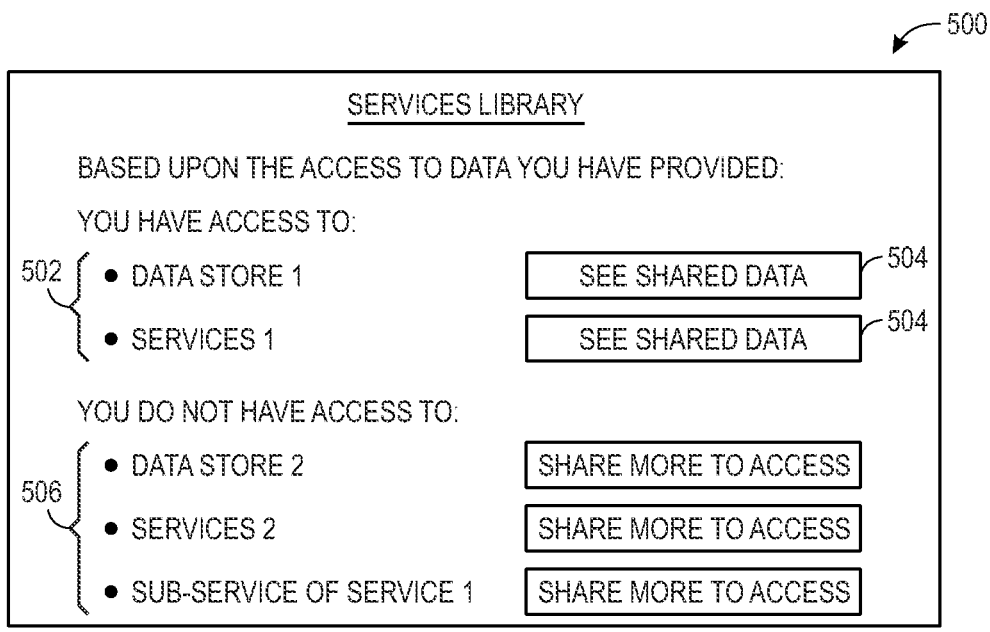
FIG. 5 is schematic diagram illustrating a graphical user interface of library services, in accordance with certain embodiments.

FIG. 5 is schematic diagram illustrating a graphical user interface (GUI) 500 of library services, in accordance with certain embodiments. As illustrated, in the current embodiment, the GUI 500 provides a list of protected systems/services 502 that the client systems 104 have access to based upon the permitted data provisions of the client systems 104. Each of the protected systems/services 502 include a selectable affordance 504 for obtaining an indication of data that is provided to the service, as permitted by the client systems 104. For example, when affordance 504 associated with Data Store 1 is selected, the permitted data provision provided by the client systems 104 to Data Store 1 may be provided.

The GUI 500 also includes protected systems/services 506 that the client does not have access to based upon a lack of permitted data provision. Each of these protected systems/services 506 include a selectable affordance 508 that links to particular areas of the client systems 104 where the proper data provisions may be enabled. When such a link is not available to the library services, a mere indication of the lacking data provision permissions may be provided.

Figure 6:
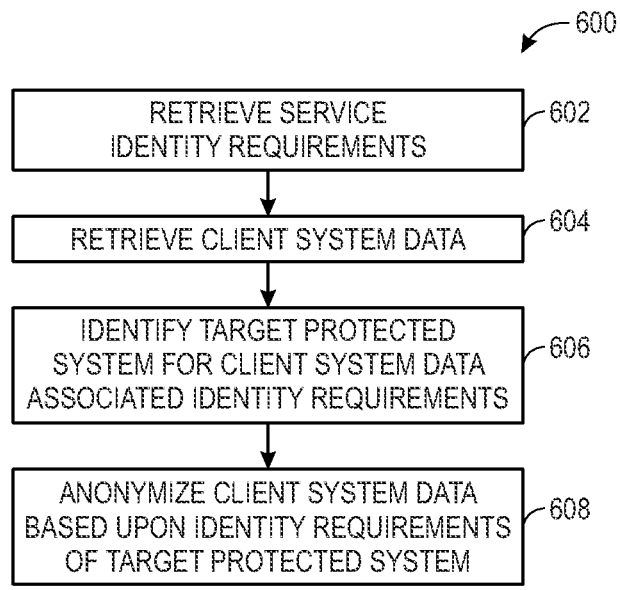
FIG. 6 is a flowchart, illustrating a process for anonymizing client data while retaining protected system requirements, in accordance with certain embodiments.

Having discussed the library services, the discussion now turns to anonymization of data. FIG. 6 is a flowchart, illustrating a process 600 for anonymizing client data while retaining protected system requirements, in accordance with certain embodiments. The process 600 begins by retrieving protected system/service identity requirements for data provided by the client systems 104 (block 602). For example, an indication of whether anonymity of data is allowed, as long as data is provided by the client systems 104 may be present in the firewall rules.

As the client system data is retrieved (block 604), the target protected system/service to be accessed and/or provided data by the client system is identified and the particular service identity requirements for that target protected system are determined (block 606).

When the identity requirements for the target protected system/service indicate that anonymity is allowed, the anonymizer circuitry may anonymize the client system data based upon this allowance (block 608). For example, the electronic data provided to the protected system/service may be stripped of client-identifying information, such as a user account, MAC address, etc.

Figure 7:
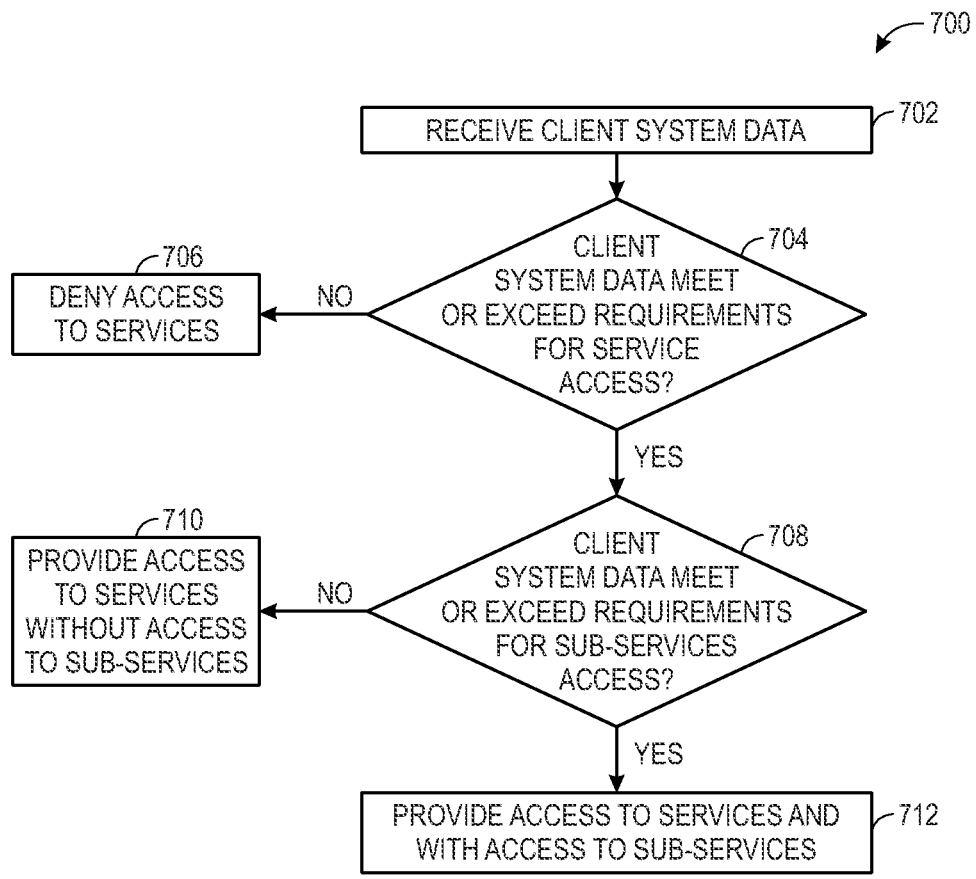
FIG. 7 is a flowchart, illustrating various levels of access to services and/or electronic devices based upon the amount and/or type of electronic data provision, in accordance with certain embodiments.

FIG. 7 is a flowchart, illustrating a process 700 for various levels of access to services and/or electronic devices based upon the amount and/or type of electronic data provision, in accordance with certain embodiments. The process 700 begins by receiving client system electronic data and/or an indication of permitted electronic data provision of the client systems 104 (block 702).

Based upon the electronic data received and/or the indication of permitted electronic data for provision by the client systems 104, a determination is made as to whether the client system data provision meets/exceeds the electronic data provision requirements for protected system/service 102 access (decision block 704). For example, the electronic data may be analyzed to identify whether a particular required type of electronic data and/or an amount of electronic data is provided or permitted to be provided by the client system 104.

If the client system 104 data provision does not meet/ exceed that electronic data provision requirements of the protected system/service 102, access may be denied to the protected system/services 102 (block 706). For example, data provision from the client system 104 may be blocked by the firewall, such that data does not flow to the protected system/services 102. By blocking provision of data proactively, the processing efficiency of the protected system/ services 102 may be increased, as these systems need not receive and/or process electronic data that does not meet threshold electronic data provision requirements.

In the current embodiment, sub-system/services may exist. In such an embodiment, an additional determination may be made as to whether the electronic data provided and/or permitted for provision meets or exceeds requirements for the sub-system/service (decision block 708).

When the electronic data provided and/or permitted for provision does not meet/exceed requirements for the sub-system/service, access to the sub-system/service may be denied (block 710). For example, as illustrated inf FIG. 5., the client system 104 does not have access to subservices of service 1 but does have access to other features of Service 1. However, when the electronic data provided and/or permitted for provision does meet/exceed the electronic data provision requirements of the sub-system/service, the client system is provided access to the sub-system/service (block 712).

Access to the system/service and/or sub-system/service may be provided by the firewall allowing data packets to flow from the client system 104 to the protected system/ services 102, enabling communication between these systems. In some embodiments, allowance of access may be cached (e.g., in the firewall rules), such that an allowance check is not required upon each access attempt by the client system 104 to the protected systems/services 102.

Figure 8:
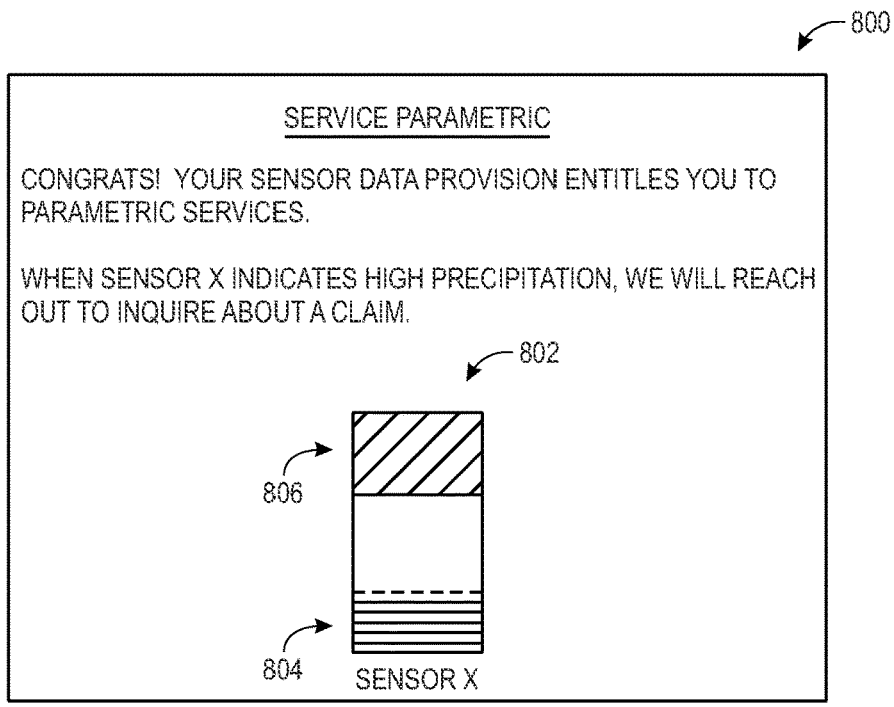
FIG. 8 is a schematic diagram, illustrating a graphical user interface for a parametric service accessed based upon provided electronic data, in accordance with certain embodiments.

FIG. 8 is a schematic diagram, illustrating a graphical user interface (GUI) 800 for a parametric service accessed based upon provided electronic data, in accordance with certain embodiments. Parametric services, as used herein, refers to conditional services, which may be triggered based upon the occurrence of a certain event. For example, in the current embodiment, the GUI 800 indicates that a parametric service access is provided to a client based upon the provision of a particular data type (e.g., sensor data indicative of whether precipitation is present in an area). Specifically, in the current embodiment, parametric services may be accessed based upon the data provision and activated when client system 104 provides data from Sensor X indicative of high precipitation. This could be calculated, for example, based upon precipitation measurements of the sensor exceeding a threshold level of precipitation and/or a prolonged time period of measured precipitation. In some embodiments, as depicted, a graphical representation 802 indicating the parameters of the parametric service activation may be provided. In the current graphical representation 802, a current data indicator 804 provides an indication of a current indication provided by Sensor X. A parametric indicator 806 indicates the levels of Sensor X data that would trigger activation of the parametric services.

Figure 9:
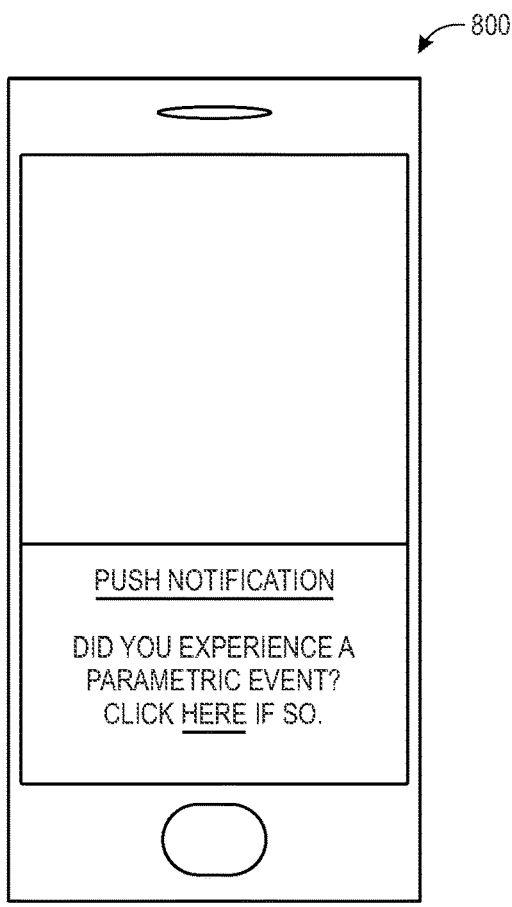
FIG. 9 is a schematic diagram, illustrating a push notification sent to an electronic device from the parametric service of FIG. 8, in accordance with certain embodiments.

FIG. 9 is a schematic diagram, illustrating an electronic device 900 that receives a push notification 902 from the parametric service of FIG. 8, in accordance with certain embodiments. The push notification 902 may be triggered in response to the parametric event occurring. For example, returning to the example of FIG. 8, the parametric service may activate when the Sensor X data meets/exceeds a threshold precipitation requirement. The activation of this parametric service may result in provision of the push notification 902, requesting the client confirm whether a parametric event occurred. A selectable link 904 may be provided in the push notification, enabling the client to confirm the parametric event via the electronic device 900. Confirming the parametric event (e.g., via the link 904), may provide further access to functionality of the parametric services (e.g., initiating a parametric insurance claim).

Figure 10:
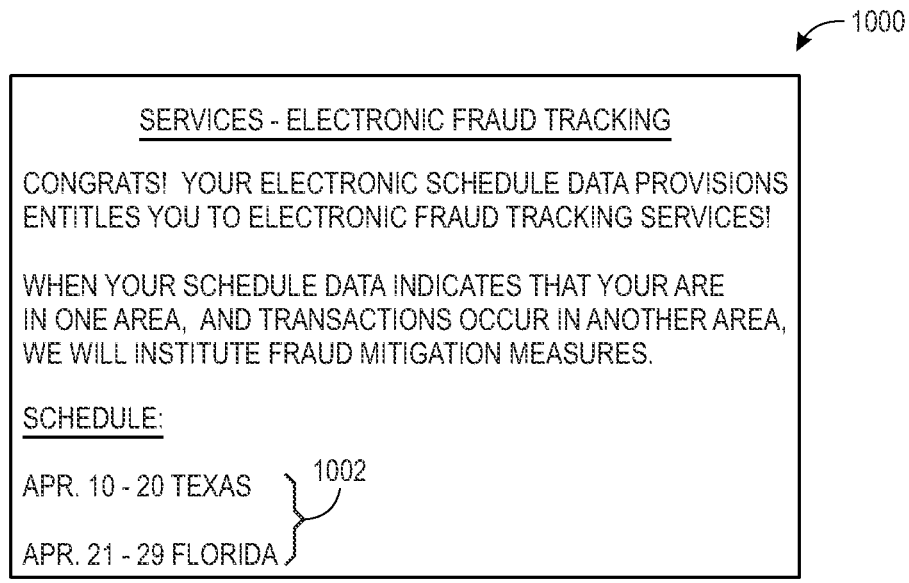
FIG. 10 is a schematic diagram, illustrating a graphical user interface for an electronic fraud tracking service accessed based upon provided electronic data, in accordance with certain embodiments.

FIG. 10 is a schematic diagram, illustrating a GUI 1000 for an electronic fraud tracking service accessed based upon provided electronic data, in accordance with certain embodiments. As depicted, access to electronic fraud tracking services may be provided when electronic scheduling data associated with the client is provided. For example, the electronic fraud tracking service may utilize electronic calendar entries to identify predicted locations of the client user. These locations may be used to identify whether fraudulent transactions (e.g., financial transactions) have likely occurred (e.g., because they are in locations other than the predicted locations of the client user).

For example, as illustrated in GUI 1000, the fraud alert services may be activated when transactions occur in an area different than where the client user is supposed to be, according to the electronic schedule data provided by the client systems 104. Here, the GUI 1000 provides an indication 1002 of predicted locations, as identified by extracting locations from provided electronic schedule information. The electronic schedule information could include, for example, a universal calendar file (e.g., an ICS file format). When a transaction (e.g., financial transaction) is sourced at a common time but different location than that predicted, the fraud alert service may be activated.

Figure 11:
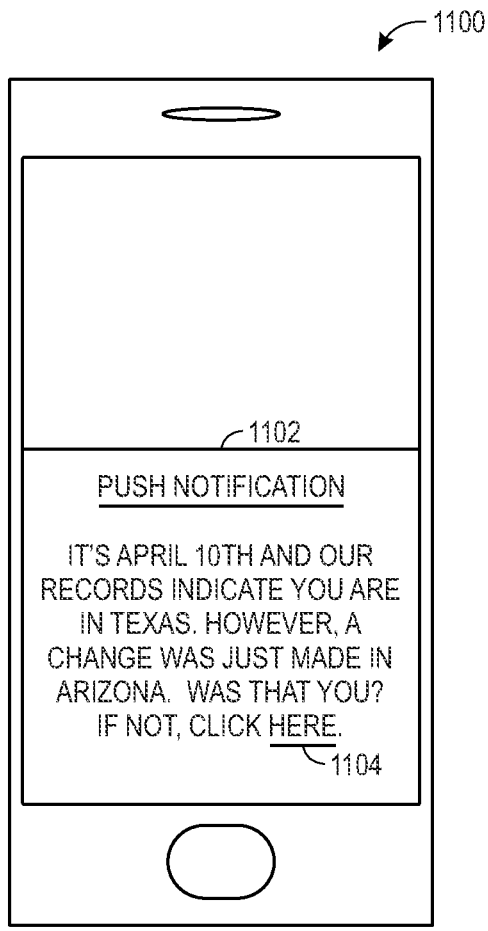
FIG. 11 is a schematic diagram, illustrating a push notification sent to an electronic device from the electronic fraud tracking service of FIG. 10, in accordance with certain embodiments.

FIG. 11 is a schematic diagram, illustrating an electronic device 1100 that receives and displays a push notification 1102 from the electronic fraud tracking service of FIG. 10, in accordance with certain embodiments. The push notification 1102 may be provided in response to the fraud alert service activation. For example, as illustrated, the push notification 1102 indicates that it is April 10$^{th}$ and a transaction occurred in Arizona, though the client user is predicted as being in Texas. A confirmation link 1104 may be provided in the push notification 1102 to confirm whether the transaction was implemented by the client user.

The current techniques provide flexible access rights based upon an amount of permitted electronic data provided by client systems. This results in an enhanced electronic system/service access by reducing electronic data received/processed by protected systems/services. For example, a pre-emptive blocking of access to protected systems/services when electronic data provision requirements are not met may reduce an amount of processing by the protected systems/services, as opposed to systems that do not implement this proactive blocking.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors, cause the one or more processors to:
   receive an indication of data provision requirements of a protected system/service;
   receive an indication of data provision permitted by one or more client systems;
   determine whether the one or more client systems meets the data provision requirements based upon the indication of data provision permitted by the one or more client systems;
   when the one or more client systems meet the data provision requirements, provide access to the protected system/service; and
   otherwise, when the one or more client systems do not meet the data provision requirements, refrain from providing access to the protected system/service, by refraining from sending data packets sourced by the one or more client systems to the protected system/service.

2. The machine-readable medium of claim 1, comprising instructions that, when executed by the one or more processors, cause the one or more processors to:
   generate library service graphical user interface (GUI) data that provides an indication of the protected system/service and whether the one or more client systems meet the data provision requirements; and
   provide the library service GUI data to at least one of the one or more client systems for rendering by the at least one of the one or more client systems.

3. The machine-readable medium of claim 2, comprising instructions that, when executed by the one or more processors, cause the one or more processors to:
   generate the library service GUI data for a plurality of protected systems/services, by iteratively determining whether the one or more client systems meets data provision requirements of each of the plurality of protected systems/services.

4. The machine-readable medium of claim 3, wherein the library service GUI data comprises a link, that when selected, enables viewing of electronic data permitted for provision to at least a portion of the plurality of protected systems/services.

5. The machine-readable medium of claim 3, wherein the library service GUI data comprises a link, that when selected, enables viewing of electronic data provision that the one or more client systems are lacking to access at least a portion of the plurality of protected systems/services.

6. The machine-readable medium of claim 1, comprising instructions that, when executed by the one or more processors, cause the one or more processors to:
receive the indication of the data provision requirements of the protected system/service from an application programming interface (API) of the protected system/service.

7. The machine-readable medium of claim 1, comprising:
storing the indication of the data provision requirements of the protected system/service at a firewall rule datastore.

8. The machine-readable medium of claim 1, wherein the protected system/service comprises a parametric service that activates on occurrence of a parameter.

9. The machine-readable medium of claim 8, wherein the parametric service comprises a service that provides access based upon a particular type of sensor data being provided to the parametric service, wherein the particular type of sensor data provides an indication of the parameter.

10. The machine-readable medium of claim 1, wherein the protected system/service comprises an electronic fraud tracking service.

11. The machine-readable medium of claim 10, wherein the electronic fraud tracking service comprises a service that provides access based upon a provision of electronic scheduling data being provided to the electronic fraud tracking service.

12. A computer-implemented method, comprising:
receiving an indication of data provision requirements of a protected system/service;
receiving an indication of data provision permitted by one or more client systems;
determining whether the one or more client systems meets the data provision requirements based upon the indication of data provision permitted by the one or more client systems;
when the one or more client systems meet the data provision requirements, providing access to the protected system/service; and
otherwise, when the one or more client systems do not meet the data provision requirements, refraining from providing access to the protected system/service, by refraining from sending data packets sourced by the one or more client systems to the protected system/service.

13. The computer-implemented method of claim 12, comprising:
generating library service graphical user interface (GUI) data that provides an indication of the protected system/service and whether the one or more client systems meet the data provision requirements; and
providing the library service GUI data to at least one of the one or more client systems for rendering by the at least one of the one or more client systems.

14. The computer-implemented method of claim 13, comprising:
generating the library service GUI data for a plurality of protected systems/services, by iteratively determining whether the one or more client systems meets data provision requirements of each of the plurality of protected systems/services.

15. The computer-implemented method of claim 14, wherein the library service GUI data comprises:
a first link, that when selected, enables viewing of electronic data permitted for provision to at least a portion of the plurality of protected systems/services; and
a second link, that when selected, enables viewing of electronic data provision that the one or more client systems are lacking to access at least a portion of the plurality of protected systems/services.

16. The computer-implemented method of claim 12, comprising:
receiving the indication of the data provision requirements of the protected system/service from an application programming interface (API) of the protected system/service.

17. The computer-implemented method of claim 12, comprising:
storing the indication of the data provision requirements of the protected system/service at a firewall rule datastore.

18. The computer-implemented method of claim 12, wherein the protected system/service comprises a parametric service that activates on occurrence of a parameter, the parametric service comprising an electronic fraud tracking service that provides access based upon electronic scheduling data being provided to the electronic fraud tracking service.

19. A network router, configured to:
receive an indication of data provision requirements of a protected system/service;
receive an indication of data provision permitted by one or more client systems;
determine whether the one or more client systems meets the data provision requirements based upon the indication of data provision permitted by the one or more client systems;
when the one or more client systems meet the data provision requirements, provide access to the protected system/service; and
otherwise, when the one or more client systems do not meet the data provision requirements, refrain from providing access to the protected system/service, by refraining from sending data packets sourced by the one or more client systems to the protected system/service.

20. The network router of claim 19, configured to:
generate library service graphical user interface (GUI) data that provides an indication of the protected system/service and whether the one or more client systems meet the data provision requirements; and
provide the library service GUI data to at least one of the one or more client systems for rendering by the at least one of the one or more client systems.

* * * * *